United States Patent
Spear

(10) Patent No.: US 9,068,755 B2
(45) Date of Patent: Jun. 30, 2015

(54) SYSTEM AND METHOD FOR TEMPERATURE REGULATION

(76) Inventor: Daniel Spear, Madelia, MN (US)

( * ) Notice: Subject to any disclaimer, the term of this patent is extended or adjusted under 35 U.S.C. 154(b) by 521 days.

(21) Appl. No.: 13/473,254

(22) Filed: May 16, 2012

(65) Prior Publication Data

US 2012/0291767 A1    Nov. 22, 2012

Related U.S. Application Data

(60) Provisional application No. 61/487,016, filed on May 17, 2011.

(51) Int. Cl.
| | |
|---|---|
| *F24D 11/00* | (2006.01) |
| *F24J 2/34* | (2006.01) |
| *F24J 2/00* | (2014.01) |
| *F24D 5/00* | (2006.01) |
| *F24J 2/04* | (2006.01) |
| *A01G 9/24* | (2006.01) |

(52) U.S. Cl.
CPC .............. *F24D 11/00* (2013.01); *F24D 11/007* (2013.01); *F24D 11/003* (2013.01); *F24D 2220/006* (2013.01); *F24D 2200/14* (2013.01); *F24D 5/005* (2013.01); *F24J 2/0007* (2013.01); *F24J 2/0461* (2013.01); *A01G 9/243* (2013.01); *F24J 2/34* (2013.01); *Y02E 10/40* (2013.01); *Y02B 10/20* (2013.01)

(58) Field of Classification Search
CPC ........ Y02B 10/20; Y02B 10/22; Y02B 10/24; Y02B 30/126; Y02E 10/44; Y02E 60/142; F24D 11/007; F24D 11/0264; F24D 5/005; F24D 3/005; F24D 11/003; F24D 11/0221; F24D 2200/14; F24D 2/0007; F24J 2/34; F24J 2/345; F24J 2/0461; F28D 20/0043; A01G 9/243

See application file for complete search history.

(56) References Cited

U.S. PATENT DOCUMENTS

| | | | | | |
|---|---|---|---|---|---|
| 4,213,448 | A | * | 7/1980 | Hebert | 126/589 |
| 4,323,054 | A | * | 4/1982 | Hummel | 126/631 |
| 4,373,573 | A | * | 2/1983 | Madwed | 165/236 |

* cited by examiner

*Primary Examiner* — David J Laux
(74) *Attorney, Agent, or Firm* — Dorsey & Whitney LLP

(57) ABSTRACT

A system and method for regulating the temperature of a building interior, the building including at least one thermal mass for receiving and holding heat, distribution vents and an air return, the method including receiving and holding heat in the at least one thermal mass, enabling an air flow from the at least one thermal mass using the distribution vents, and returning the air flow to the at least one thermal mass via the air return, wherein the air flow tends to maintain a generally constant temperature in the building.

16 Claims, 23 Drawing Sheets

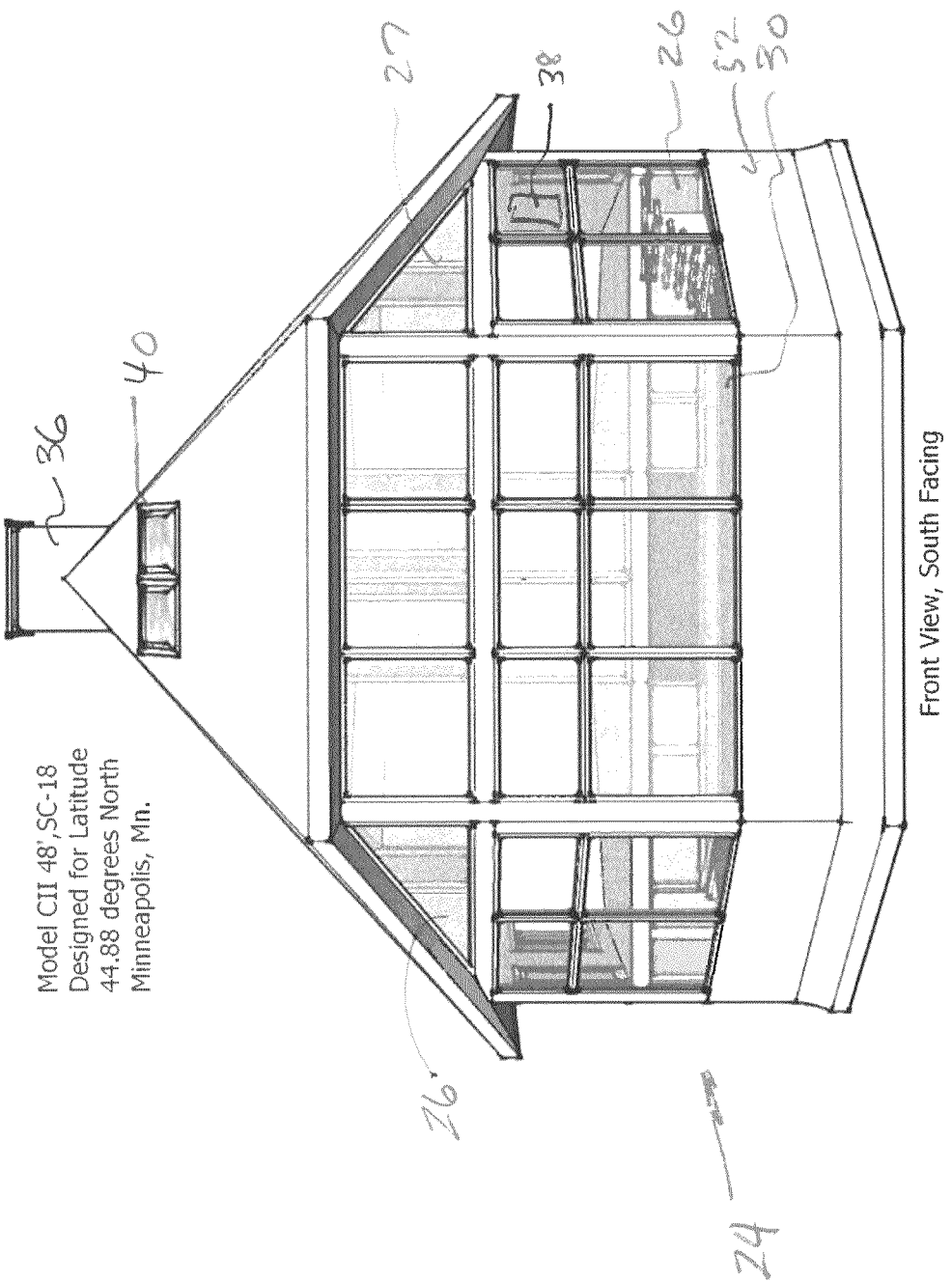

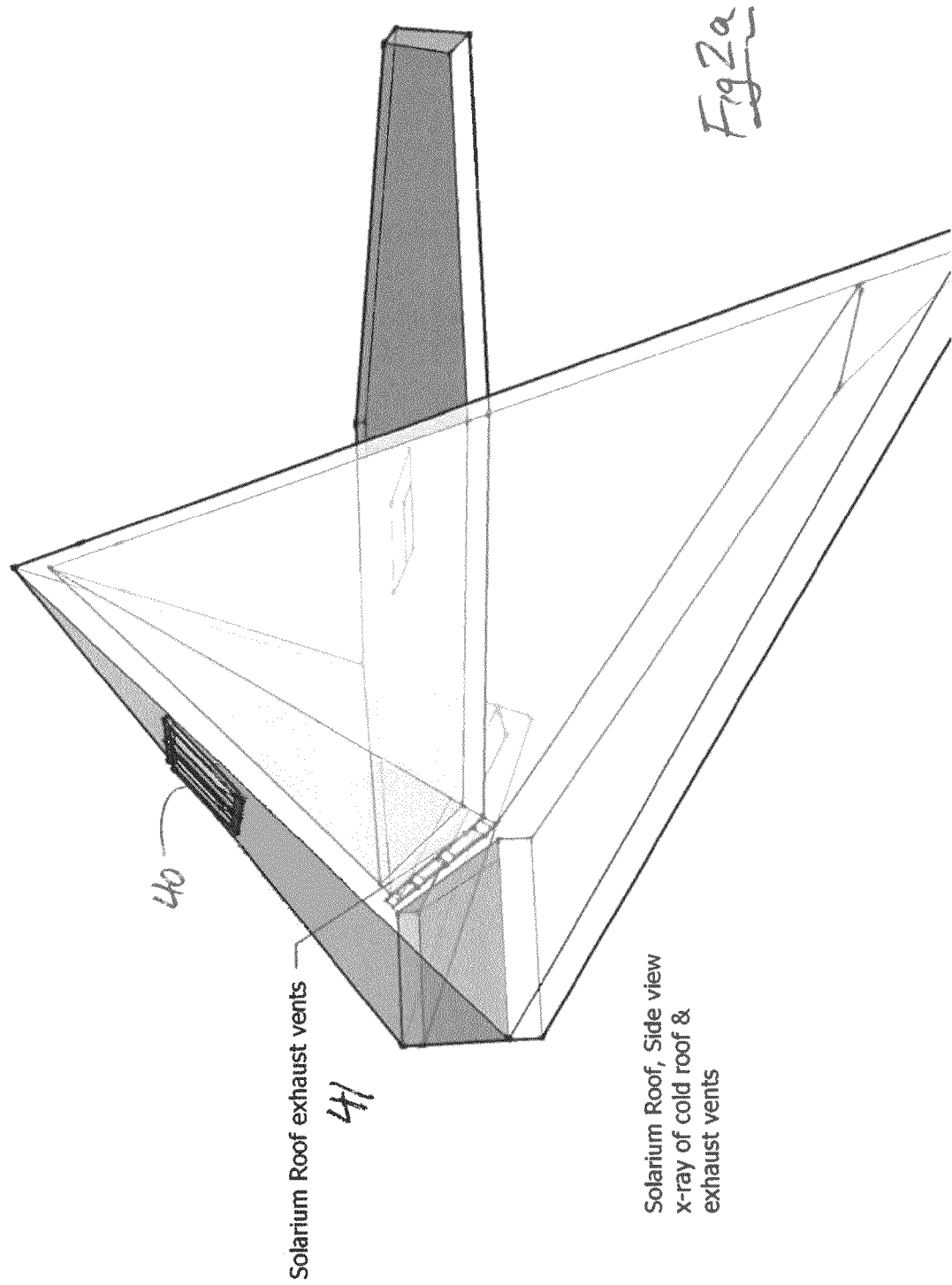

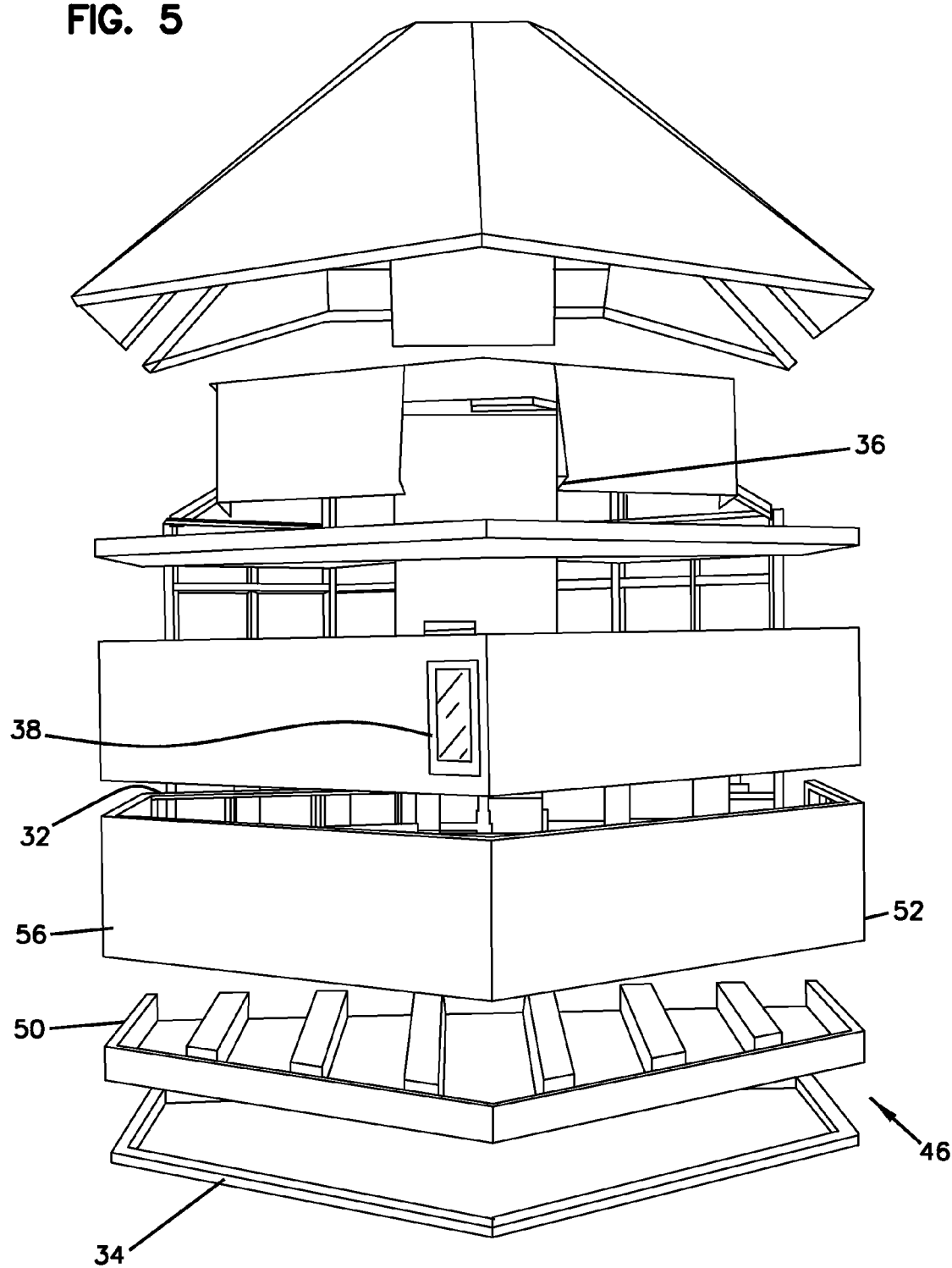

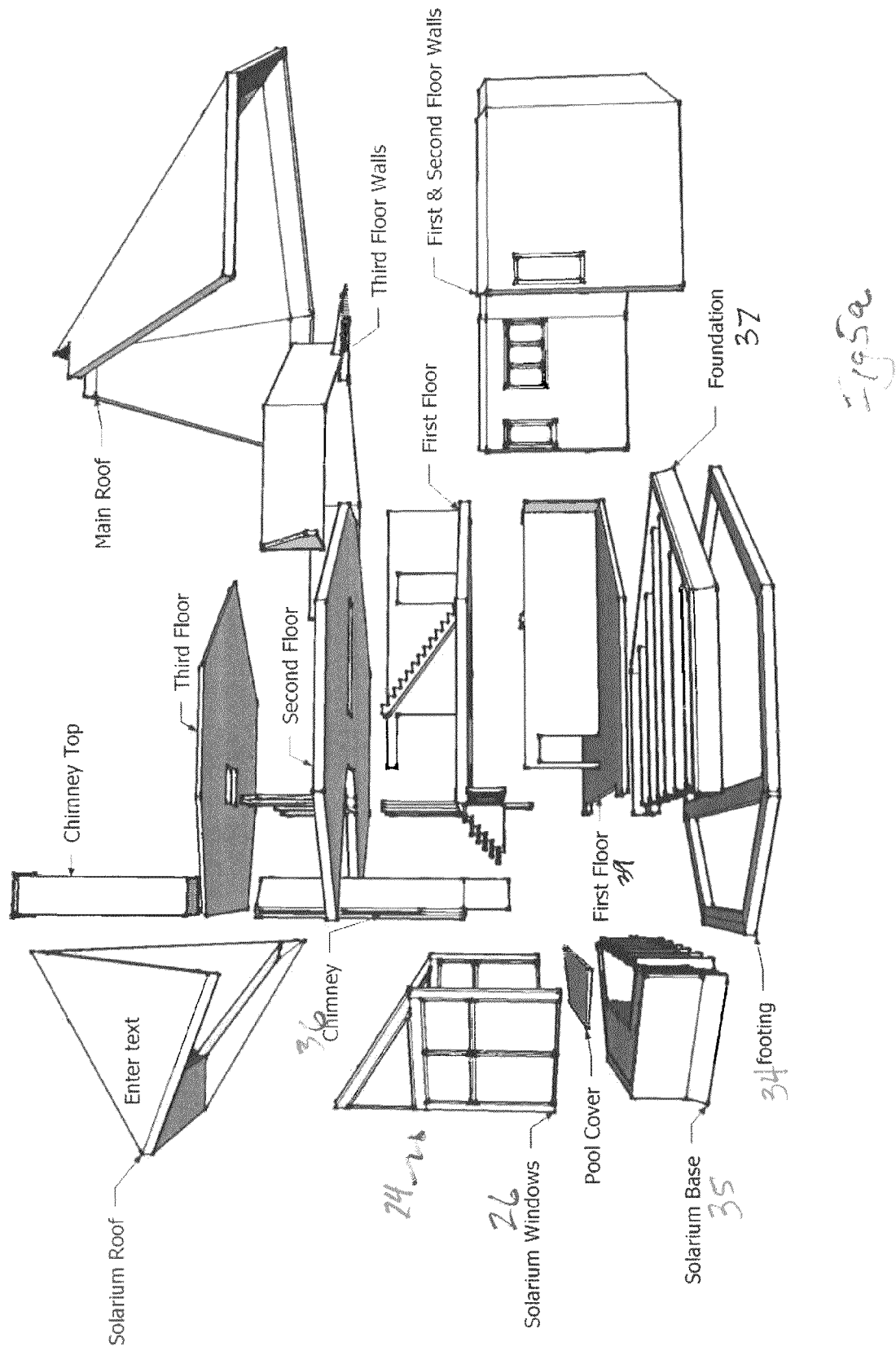

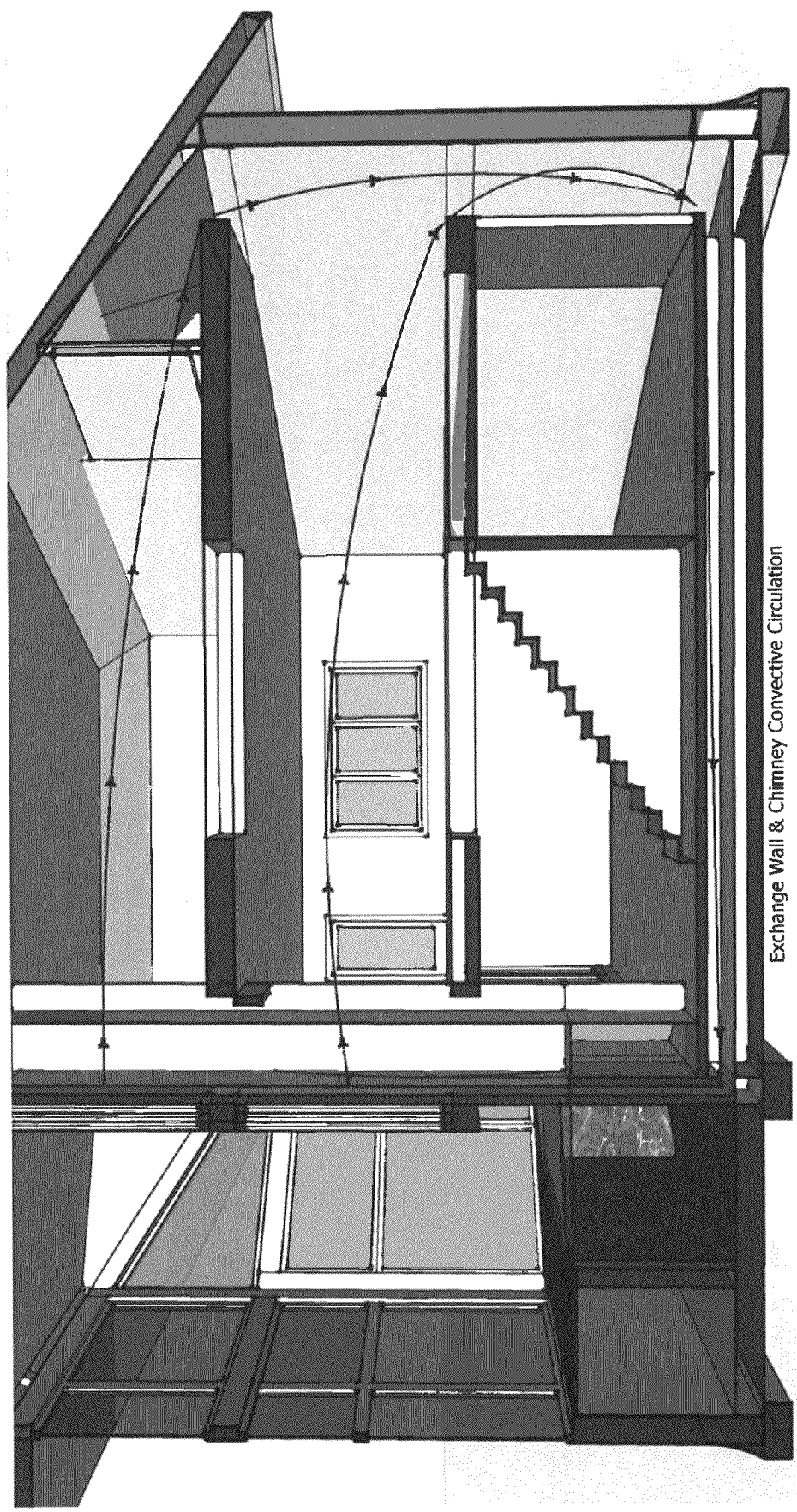

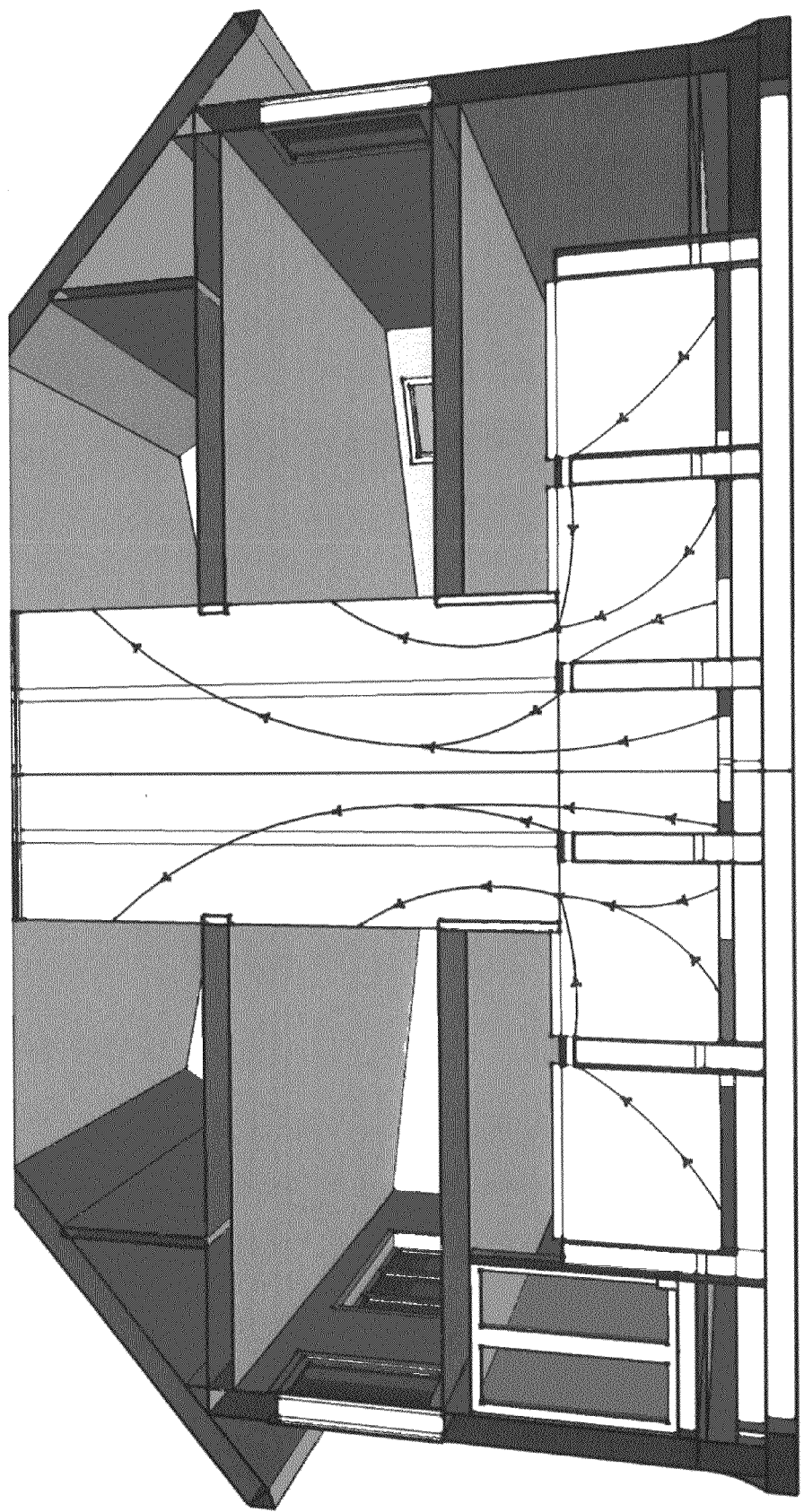

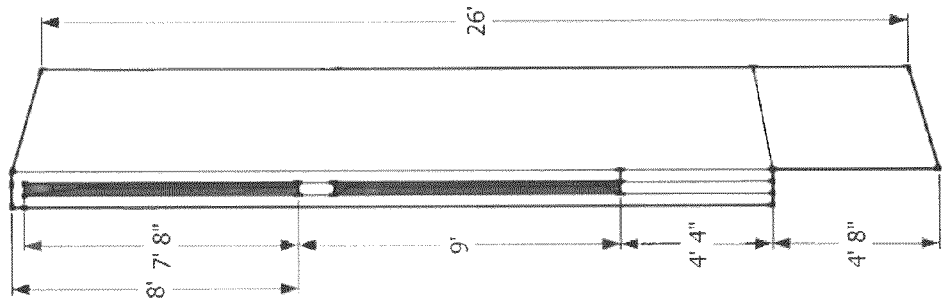
Chimney, Side View

SYSTEM AND METHOD FOR TEMPERATURE REGULATION

BACKGROUND

The present invention relates to devices and/or systems for regulating the temperature in a building, and to methods of making and using such devices and/or systems. In some embodiments, it relates to regulating building temperatures using so-called "green energy," e.g. using solar and geothermal energy, heat transfer and temperature gradient principles, applicable thermal energy and transfer principles, and structures and/or features of the building to heat and cool the building.

Solar and geothermal energy are excellent sources of green energy, i.e. energy typically involving lower levels of carbon dioxide than, for example, burning coal or oil. They are also useful and have been used for temperature regulation in buildings. While there are various systems and methods that use green energies, there is a lack in the art of temperature regulation systems and/or methods optimally harnessing them to cool and heat buildings across different seasons. Additionally, many known methods and systems rely heavily on supplemental energy sources, e.g. fans, pumps, etc., for temperature regulation.

Thus, there exists a need for a system and method for efficiently regulating the temperature of a building using radiant solar and geothermal energy. Particularly, there exists a need for a system and method for storing and utilizing solar and geothermal energy such that a building may be kept at a stable temperature across seasons and outside temperature variations.

SUMMARY

In one embodiment, the present invention comprises a method for regulating the interior temperature of a building, the building including at least one thermal mass for receiving and holding heat and/or remaining relatively colder when it is not receiving heat than when it is, distribution vents and an air return, the method comprising: receiving and holding heat and/or cold in the at least one thermal mass, enabling an air flow across and/or adjacent to the at least one thermal mass using the distribution vents and building shape, and returning the air flow to the at least one thermal mass via the air return, wherein the temperature of the at least one thermal mass is distributed through the building by the air flow. In some embodiments, the air flow is convective and, in some embodiments, wholly free or natural, i.e., not driven to flow by an external power such as a fan.

In one embodiment, the present disclosure relates to a method for regulating the temperature of a building, including capturing thermal energy in an energy sink, store or storage structure associated with the building. Air is enabled to flow freely and/or naturally from the energy store throughout the building via distribution vents, and is returned to the energy store via a return air shaft. The thermal energy is thus distributed through the building by a cyclical air flow enabled and/or facilitated by structures, features, the arrangement of the structures and/or features, and/or the shape of the building.

In one embodiment, a building and system in accordance with the present invention operates passively under the thermal principle that everything wants to be the same temperature. During the day, a thermal mass, or energy sink or storage structure, is exposed to sunlight and absorbs and holds heat; when the energy sink or storage structure is warmer than the building, it releases heat. When it is cooler, it absorbs heat. Thus, a cyclical air flow within the building is generated.

The present invention relates to a temperature regulation system and method wherein a building according to the present invention efficiently utilizes solar and geothermal energy to heat and cool the building. In some embodiments, a solarium collects and stores radiant energy from the sun, and conduction draws cold from the ground through the floor or footprint of the building. The solar and/or geothermal energy is then utilized to heat and/or cool the building through conduction and convection, which are enabled, facilitated and/or improved by air flow characteristics of the building. Because the system and method in accordance with the present invention involve using renewable energy sources and passive, or natural or free, air flows, they have a low ecological impact.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

FIG. 2 is an elevational view of an embodiment of a solarium of a building in accordance with the present invention.

FIG. 2a depicts an embodiment of the solarium including an embodiment of solarium roof exhaust vents.

FIG. 5 is an exploded view of an embodiment of a building in accordance with the present invention.

FIG. 5a is an exploded view of an embodiment of a building in accordance with the present invention.

FIG. 10a, partially in cross-section, depicts an airflow through an embodiment of a building in accordance with the present invention.

FIG. 11a, partially in cross-section, depicts an airflow through an embodiment of a building in accordance with the present invention.

FIG. 18a depicts an embodiment of a portion of a chimney in accordance with the present invention.

DETAILED DESCRIPTION

Any reference to "the invention" herein shall not be construed as a generalization, limitation or characterization of any subject matter disclosed herein and shall not be considered to be an element or limitation of the appended claims except if and/or where explicitly recited in a claim(s). With regard to fastening, mounting, attaching or connecting components, unless specifically described as otherwise, conventional mechanical fasteners and methods may be used. Other appropriate fastening or attachment methods include adhesives, welding and soldering, including with regard to an electrical system, if any. In embodiments with electrical features or components, suitable electrical components and circuitry, wires, wireless components, chips, boards, microprocessors, inputs, sensors, outputs, displays, control components, etc. may be used. Generally, unless otherwise indicated, the materials for making embodiments and/or components thereof may be selected from appropriate materials such as metal, metallic alloys, ceramics, plastics, etc. Unless otherwise indicated specifically or by context, positional terms (e.g., up, down, front, rear, distal, proximal, etc.) are descriptive not limiting. Same reference numbers are used to denote same parts or components.

Figure 1:
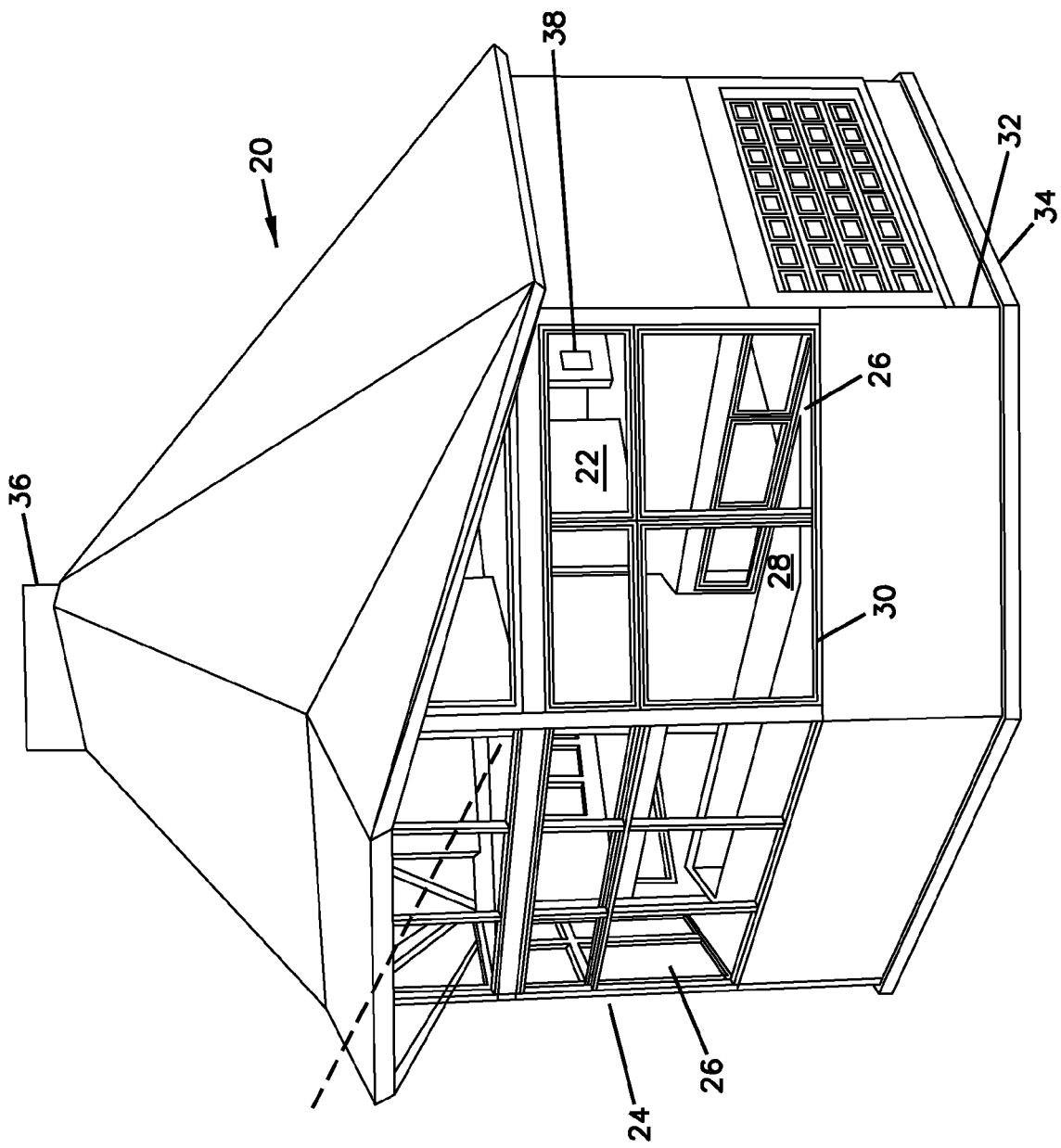
FIG. 1 is a perspective view of an embodiment of a building in accordance with the present invention.

FIG. 1 is a perspective view of an embodiment of a building in accordance with the present invention. The building 20, and the temperature regulation system it and/or its features provides and/or enables, includes an interior building space 22 to be temperature regulated, a solarium 24 having one or more solarium windows 26, an energy storage pool 28, an apron 30, an exchange wall 32, a base 34, and a chimney 36, and a computer control system 38. The energy storage pool 28, exchange wall 32, base 34, and chimney 36 may be referred to and/or thought of as an energy absorber, a thermal mass or simply the mass. The building 20 allows for heat to be received and collected or held by the mass, and for heated and/or cooled air to be cycled through the building 20 back to the mass. The computer system 38, including a suitable processor and/or control unit and temperature sensors and displays suitably located in the building, may be operably coupled to the solarium windows 26 to mitigate and control heat loss and gain. This may be accomplished by opening and closing, in some embodiments automatically in response to sensed temperatures, the windows 26 to cool and/or heat the building 20.

The solarium 24 receives, collects and stores radiant energy from the sun. This activates cycles of convection and conduction. Conduction allows cool temperature to be pulled from concrete, e.g. in and/or below the base 34, and/or cool ground beneath the building 20. Convection means air, heated by the mass, in turn heated by the sun, flows and is distributed throughout the building 20 cyclically. The stored energy combined with the building design moderates and creates a balanced temperature year-round. The energy storage mass provides heat for long periods of cold without sun and, conversely, cool for periods of greater warmth.

Figure 12:
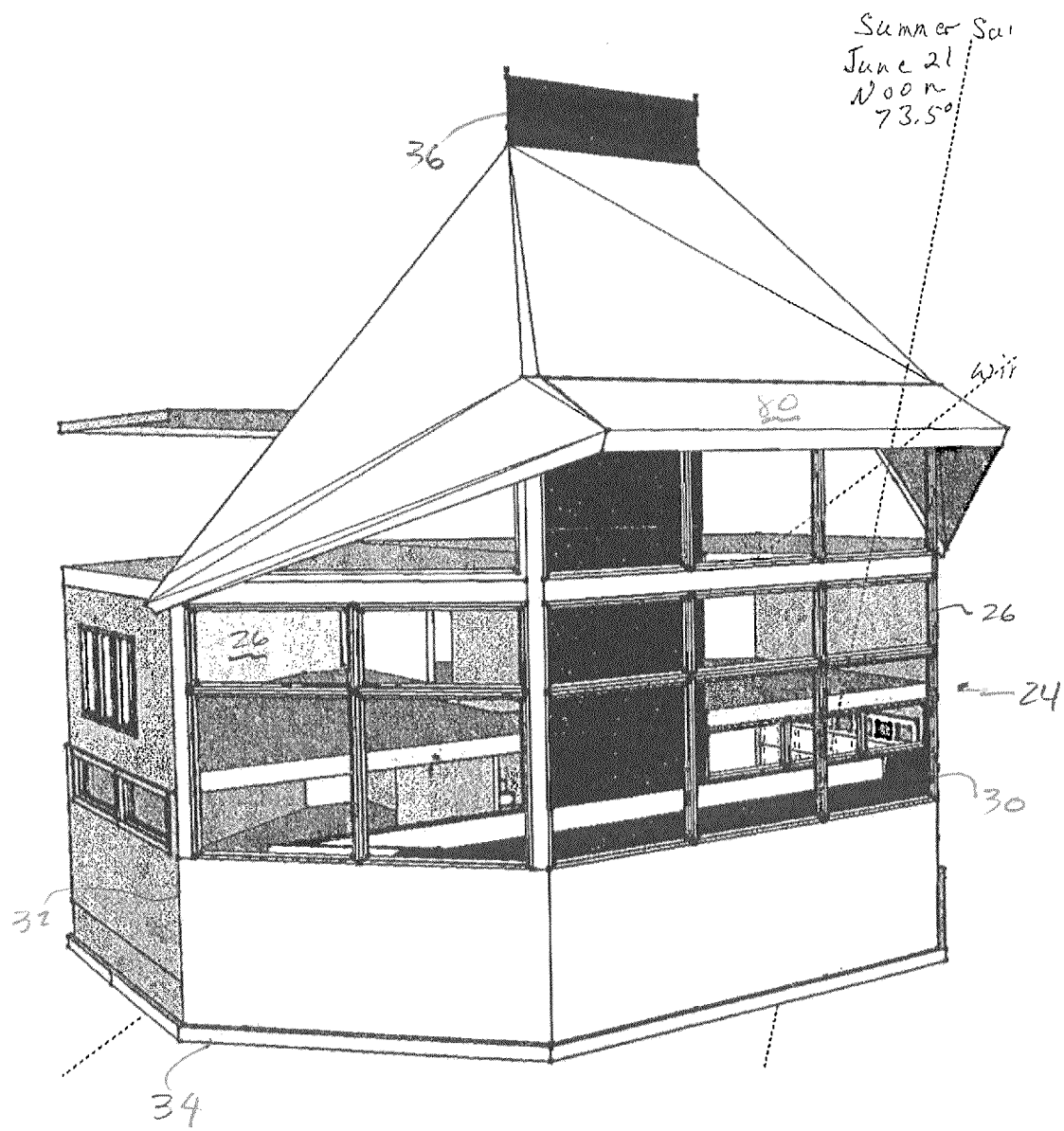
FIG. 12 is a perspective view of a portion of a building in accordance with the present invention depicting interaction of sunlight and the building.
Figure 13:
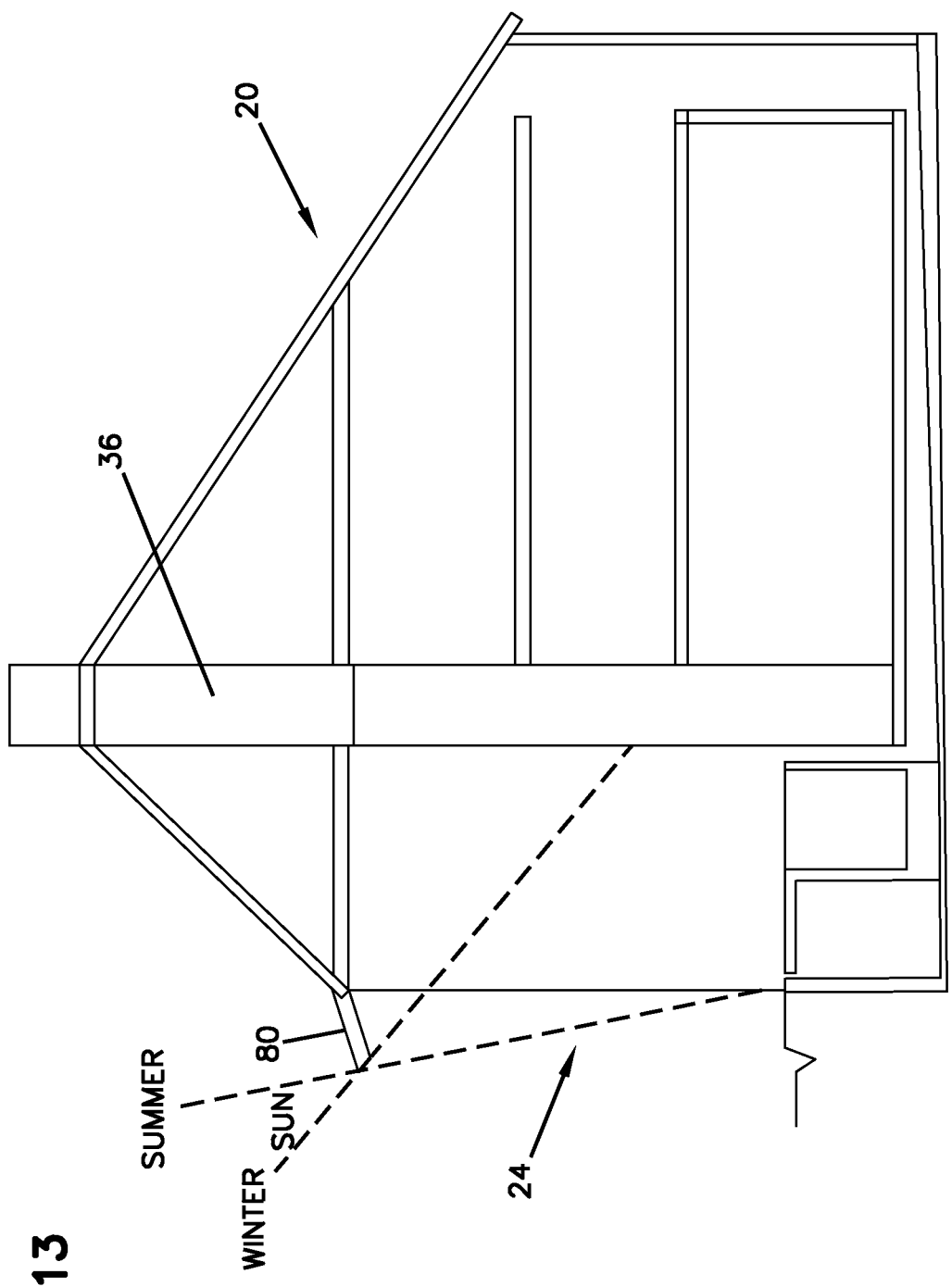
FIG. 13 is an elevational schematic of an embodiment of a building in accordance with the present invention depicting interaction of sunlight and the building.

In one embodiment, shown in FIG. 2, the solarium 24 may be designed to include 45 degree angled windows 26 to catch both the morning and afternoon sun at the southeast and southwest corners, and the roof of the building, and/or solarium, may include one or more skylights 40. The skylights 40 may be configured to be operable, e.g. openable, to exhaust heat. Suitable sensors (not shown) may be located throughout the building 20, including near the uppermost or highest interior portion of the building where heat may collect. Opening the skylights 40, e.g. using small motors coupled to the skylights 40 and controlled by the computer system 38, vents excess hot air. Other and/or additional vents 41, including passive exhaust and/or attic-type vents may be used as well. See, for example, FIG. 2a. The depicted and described configuration of the solarium 24 maximizes the exposure of the solarium 24 to the sun. Large glass areas allow for maximum capture and storage of the solar radiant energy. In some embodiments, other angles may be used to maximize or minimize sunlight capture by the solarium 24. The precise angles and exposure to the sun may vary depending on the location of the building 20. Exposure to sunlight and capture of heat may be further regulated through the use of window coverings, such a blinds or shades, insulated glass or so-called "smart" glass. Such peripherals may expand or restrict the amount of solar energy coming through the solarium glass. Such peripherals, including optional interior, operable glass or window walls 27 may be used to control energy and/or air flow entering the rest of the building 20. Of course, window coverings and/or smart glass may further be operably coupled to the computer and/or sensor system 38 to automatically vary the window's transparency to sunlight to adjust energy capture. Sun exposure to the solarium 24 may further be regulated through landscaping options, such as planting trees outside the solarium windows 26. For example, as latitude increases and decreases, sunlight strikes the building 20 at different angles. In some embodiments, as depicted in FIGS. 12 and 13, the angles associated with the solarium 24 may be selected to facilitate capturing and/or reflecting solar energy at a particular location. The solarium apron 30, formed of, e.g. concrete, may encompass the area below and/or surrounding the solarium windows, and lies between the outside and the pool 28. Together and/or separately, the apron 30 and pool 28 may be referred to and/or thought of as the main collectors of solar heat. In some milder climates, the pool 28 may not be necessary for heat energy storage. In some embodiments, the pool 28 may be used for potable water storage.

Figure 3:
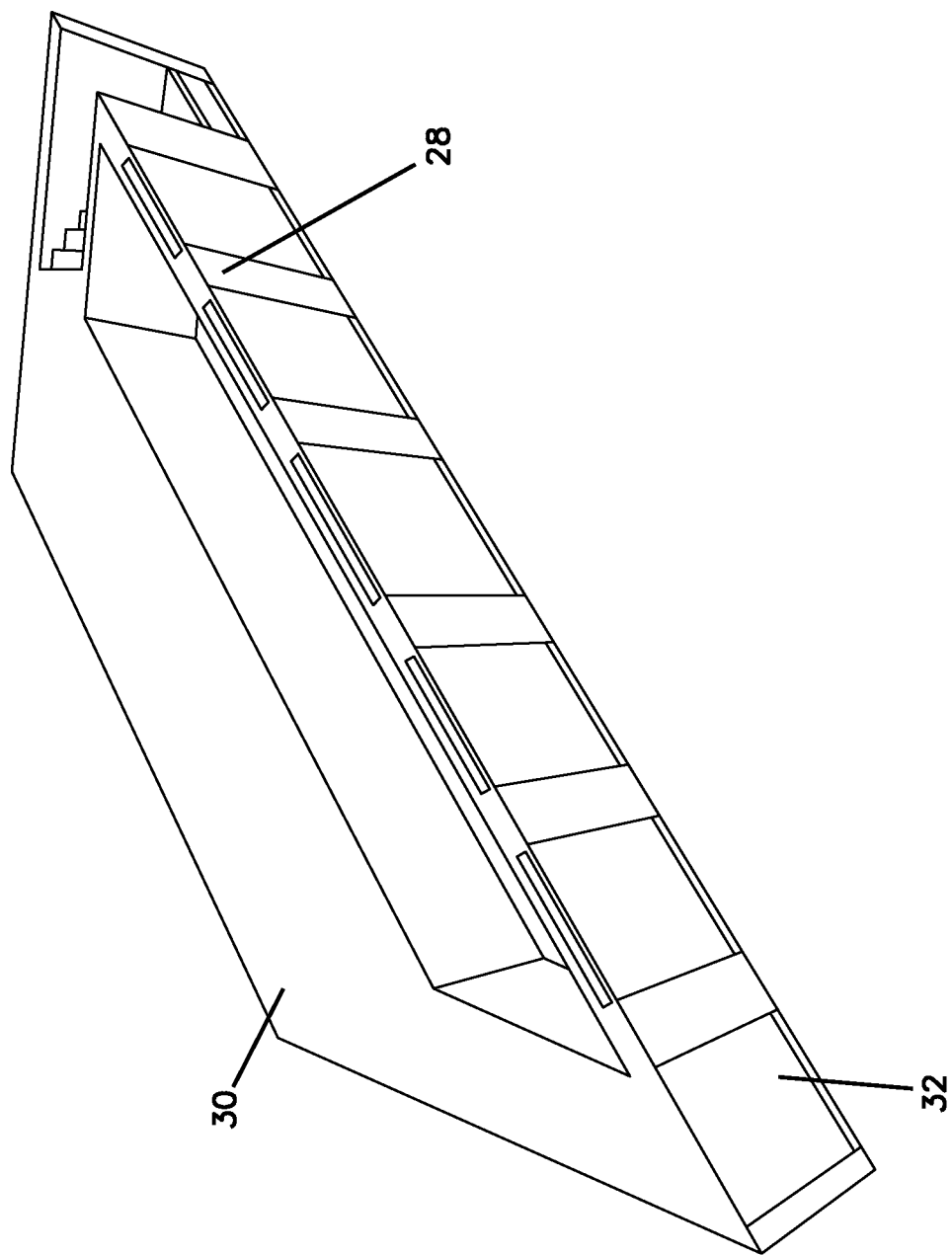
FIG. 3 shows a portion of a building in accordance with the present invention.

FIG. 3 depicts an embodiment of the solarium interior and the apron 30. The apron 30 may be black to help collect the maximum radiant energy available, and may be thin to facilitate quick heat transfer and conduction to the pool 28. Conduction may be pulled down into the pool 28, then back into the rest of the building for storage. In some embodiments, the solarium 24 may be 25% of the depth of the building to provide a suitable amount of radiant energy capture and storage.

Referring to FIGS. 2, 5, 11 and 12, the mass functions as a thermal capacitor, i.e., the pool 28, chimney 36, exchange wall 32, and base 34 all permit energy storage. The centrally located chimney 36 may serve as a structural center support for the entire building 20, in addition to its energy storage function. The mass experiences sunlight and captures energy during the daylight hours through the solarium 24, and then functions as a heat store or sink during night, as well as during days without sunlight.

Figure 4:
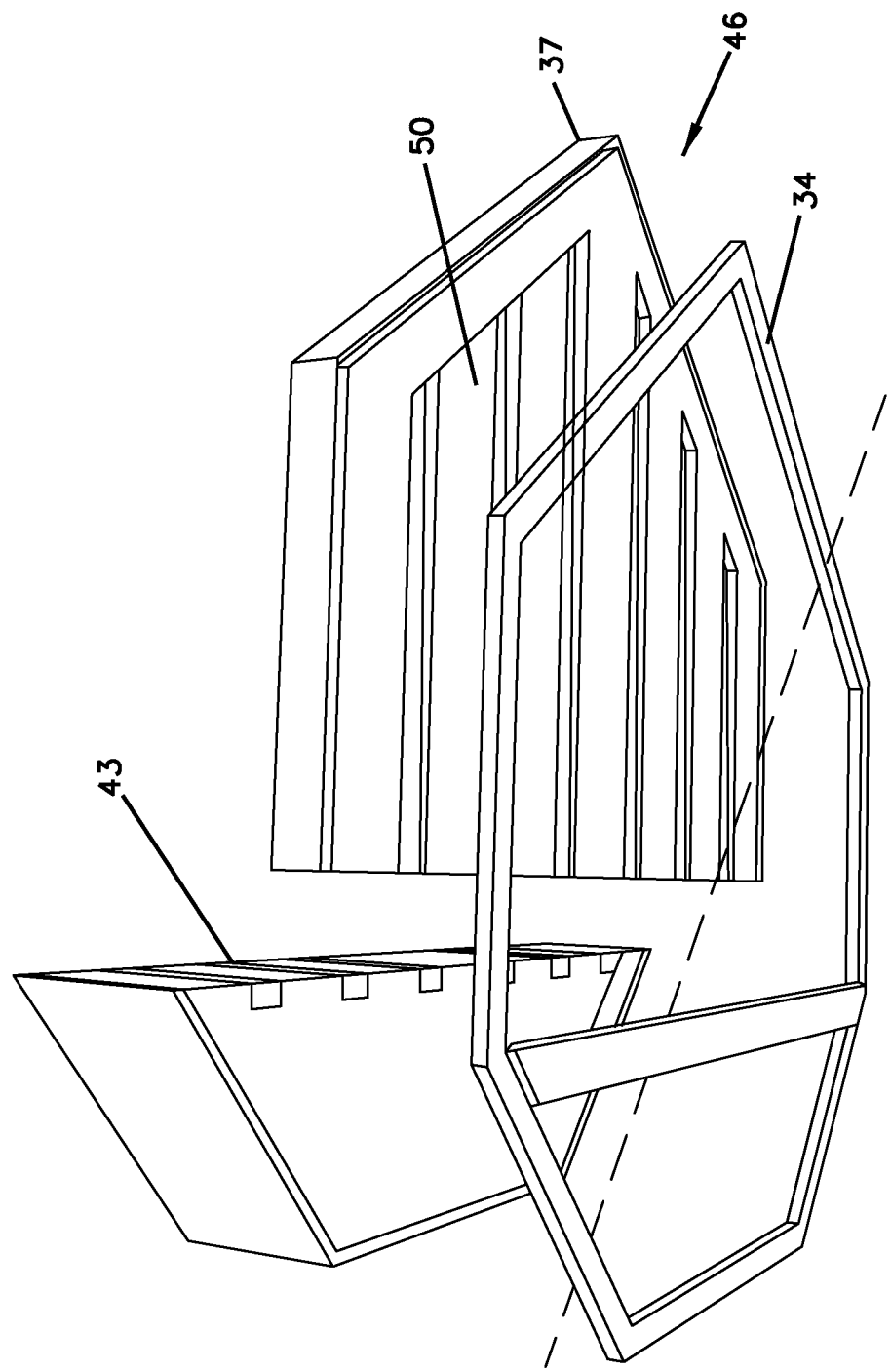
FIG. 4 shows an embodiment of a foundation in accordance with the present invention.

FIG. 4 and FIG. 11a illustrate embodiments of a foundation 46 for a portion of the building 20, e.g. under the solarium 24 and the rest of the building. In some embodiments, the foundation 46 may include and/or be thought of as comprising, a footing or base 34, a solarium base 35, exchange wall posts 48, the foundation element 37 and horizontal fins 50, which also may support the first floor 39. The exchange wall posts 48 may be one point of contact with the ground. The base 34 may be another point of contact with the ground for cooling purposes, and may be set according to latitude and climate, and in some embodiments, may be made of concrete other suitable material. The base 34 may be set on undisturbed ground, and may include 6 inches of crushed rock or other suitable material (not shown) in the center with rigid insulation. The perimeter of the base 34 may also function as a vapor barrier. In some embodiments, the base 34 may not be part of the heat store, and instead may be part of the outside wall 52. Multiple, and variable, areas and/or degrees of contact or isolation make a building designed in accordance with the present invention adaptable to many latitudes. For example, more insulation or less insulation may be used between the foundation and the ground depending on latitude and climate. The relatively constant temperature of the ground can be used to draw and store heat or, in the summer, cool, thereby helping to maintain a relatively constant temperature in the mass.

Figure 10:
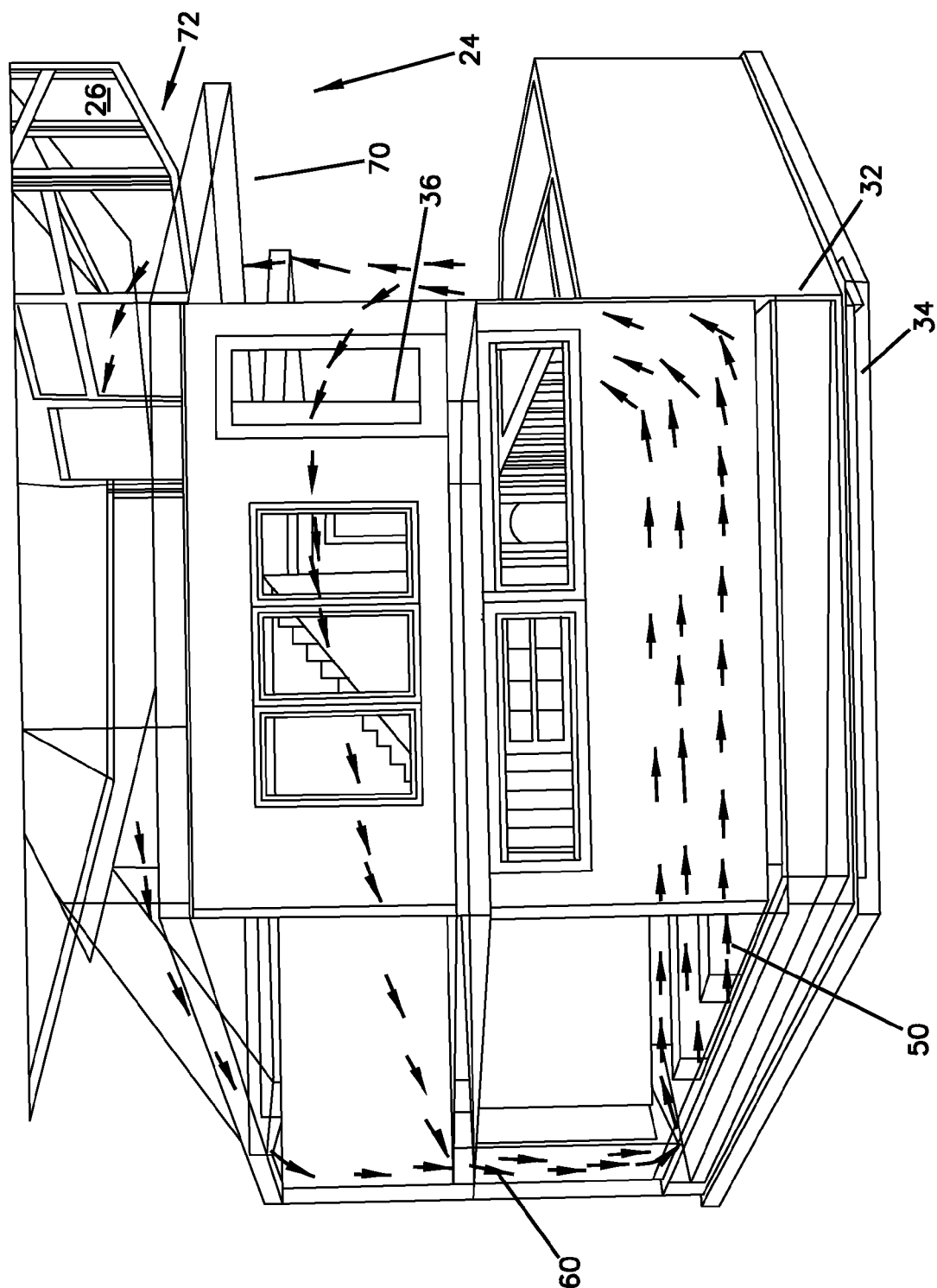
FIG. 10 is an exploded view, partially in cross-section, depicting an airflow through an embodiment of a building in accordance with the present invention.

As shown in FIGS. 5 and 5a, above the foundation, i.e. the base 34 and fill material, first floor concrete walls 56 may also be isolated from the foundation according to the location of the building. This may determine the amount and length of heat storage available. Less isolation in southern latitudes will create a shorter heating storage period and cooler level in summer. To further facilitate cold air falling, a door 58 may be added in the air return shaft 60 (see FIGS. 10 and 11).

Figure 6:
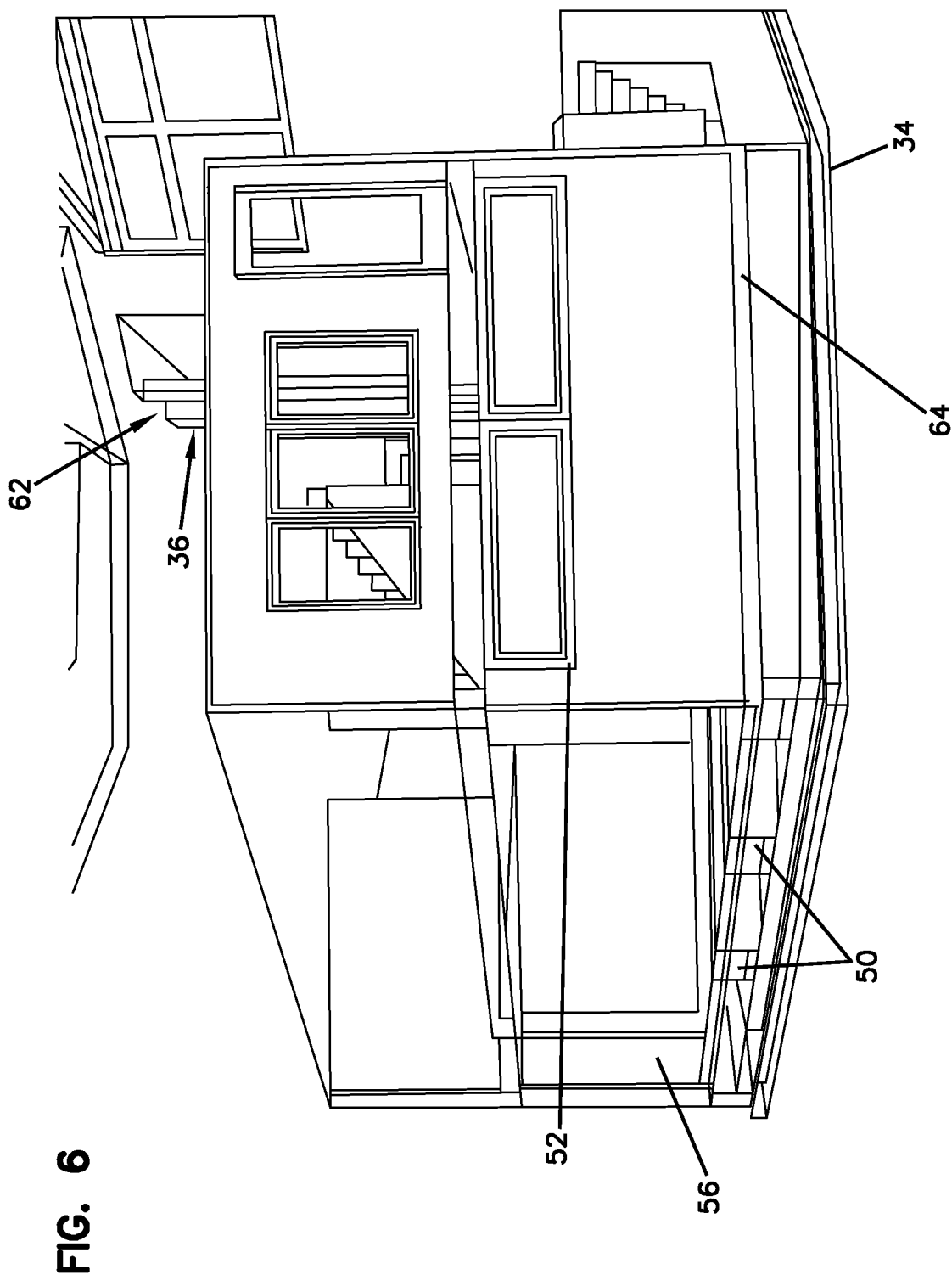
FIG. 6 is an exploded view of a portion of an embodiment of a building in accordance with the present invention.

As shown in FIG. 6, utilities 62 may be run inside to save breaks of outside walls. The utility channel 62 may further run next to the chimney 36 as pictured, and/or on both sides and/or inside the chimney, as well as in and/or through the foundation or where convenient. FIG. 6 provides another view of the first floor walls and foundation, which is insulated and provides a vapor barrier from the outside. This arrangement turns the basement into heat store, augmenting the mass. Also observable in FIG. 6 are the raised basement floors 64, which may rest on the horizontal fins 50.

Figure 7:
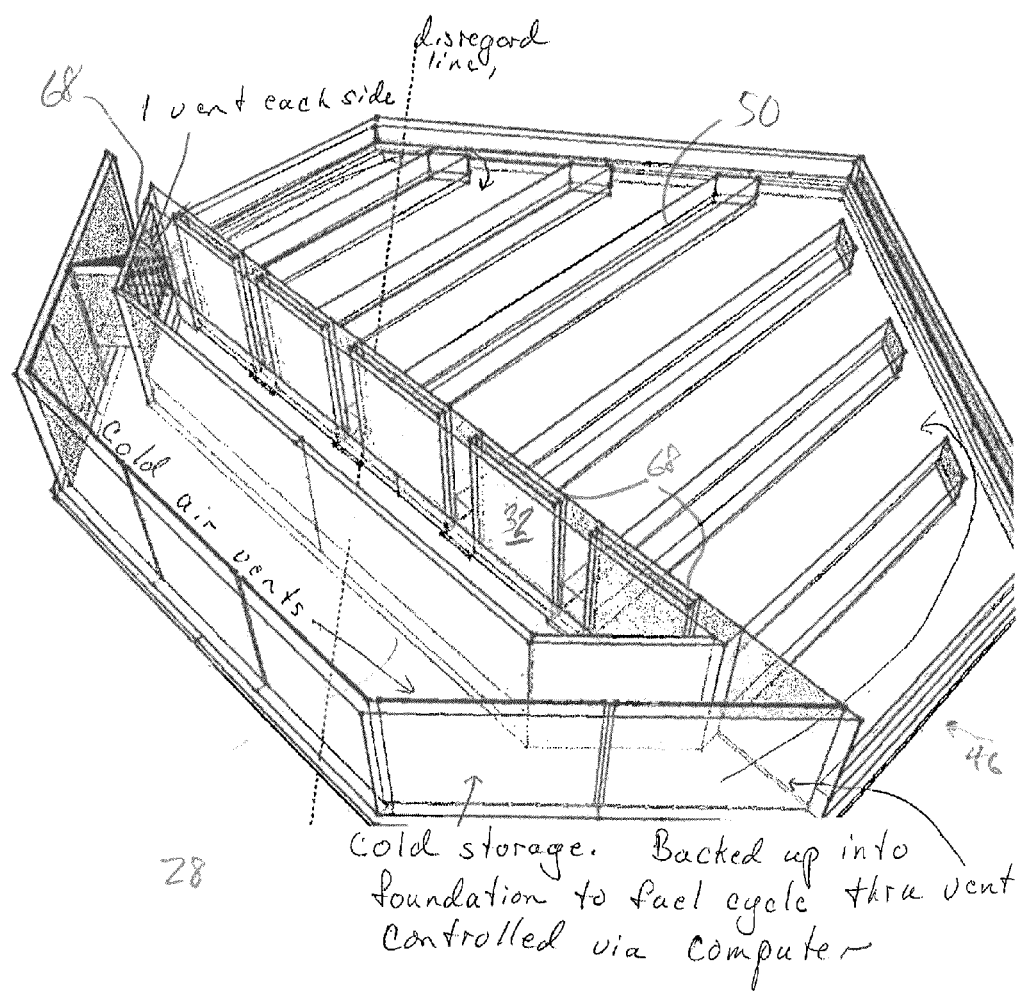
FIG. 7 is a cross-sectional view of the base of FIG. 4.

FIG. 7 illustrates the foundation 46, and the horizontal fins 50, exchange wall 32, and pool 28. Surrounding the pool 28 may be one or more cold air vents 68 to facilitate cool air flow during hot days. In some embodiments, there may be one vent 68 on each side of the pool 28. The pool 28 may further abut the exchange wall 32. Within the exchange wall 32 are further vents 68 to promote air flow along the pool/exchange wall 32 to further stimulate cool air transfer. Air is cycled through the exchange wall vents 68, which exit at the base of the horizontal fins 50, to be guided among the horizontal fins 50. The foundation and pool function as cold storage. Cold from the footings and/or earth is backed up into the foundation to fuel cycling through the vents 68. The vents 68 may be controlled, e.g. opened and/or closed, by suitable operators coupled to the computer/sensor systems 38 to help maintain a substantially constant and stable temperature, e.g. by closing off or separating the solarium from the main living space of the building 20. The position, structural and operational relationships of building components, e.g., the solarium, solarium base, chimney, exchange wall and foundation may be selected based on, for example, climate and/or the location of the building. With reference to FIG. 18a, further vents 69 for controlling and/or modifying the air flow through the building 20 may be associated with the chimney 36.

Figure 8:
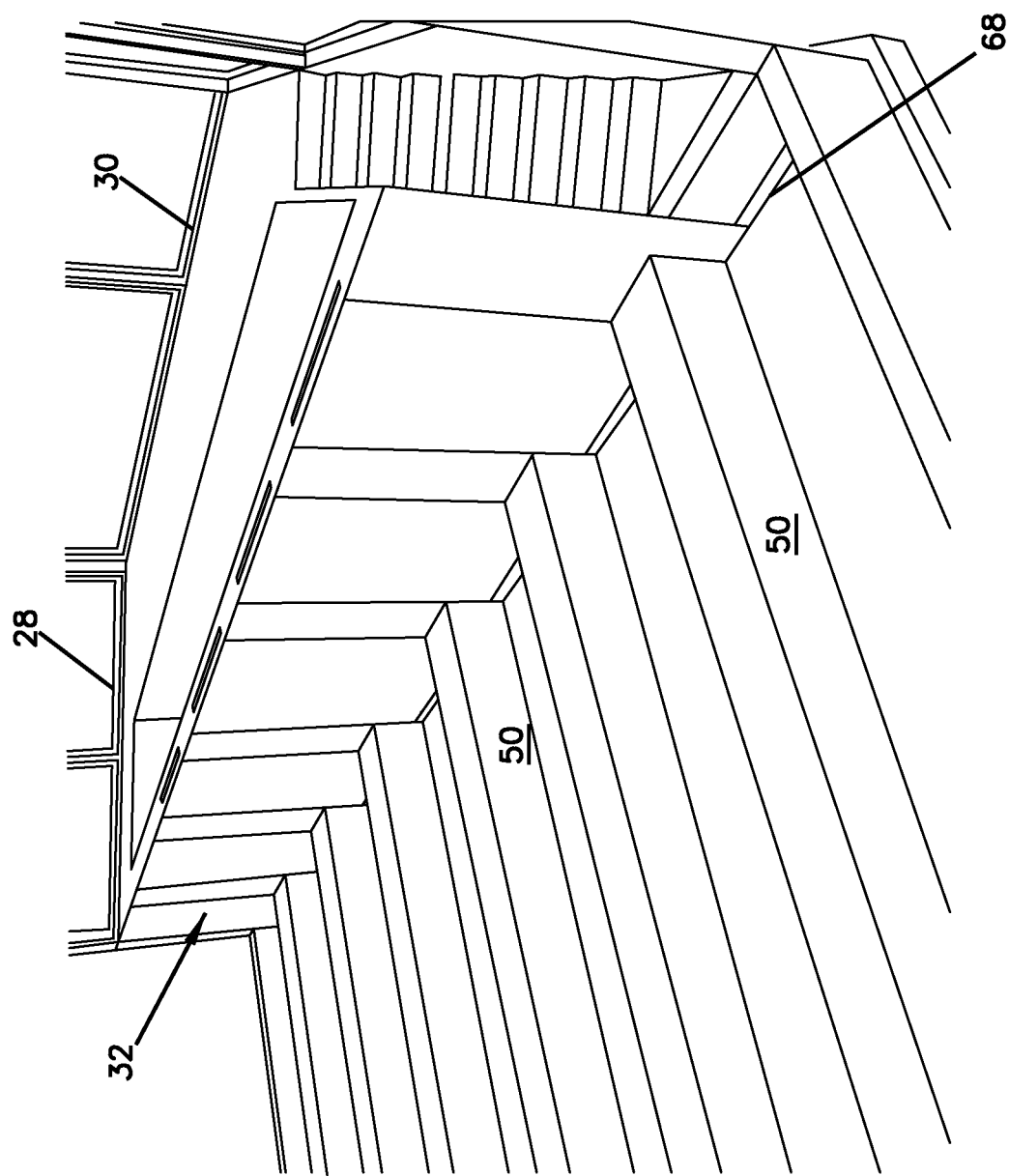
FIG. 8 is a perspective view of a portion of a building in accordance with the present invention.

FIG. 8 further illustrates the structural relationship and/or interaction between the horizontal fins 50, exchange wall 32, and the pool 28. In some embodiments, the pool 28 may be covered. The first floor (see FIG. 11a, 39) may rest on the horizontal fins 50, and may abut the exchange wall 32 to further promote heat and/or cold transfer. The convection airflow or cycle runs under the raised basement floor, hits the exchange wall 32, and is pulled underneath through the vents 68 at the base.

Figure 9:
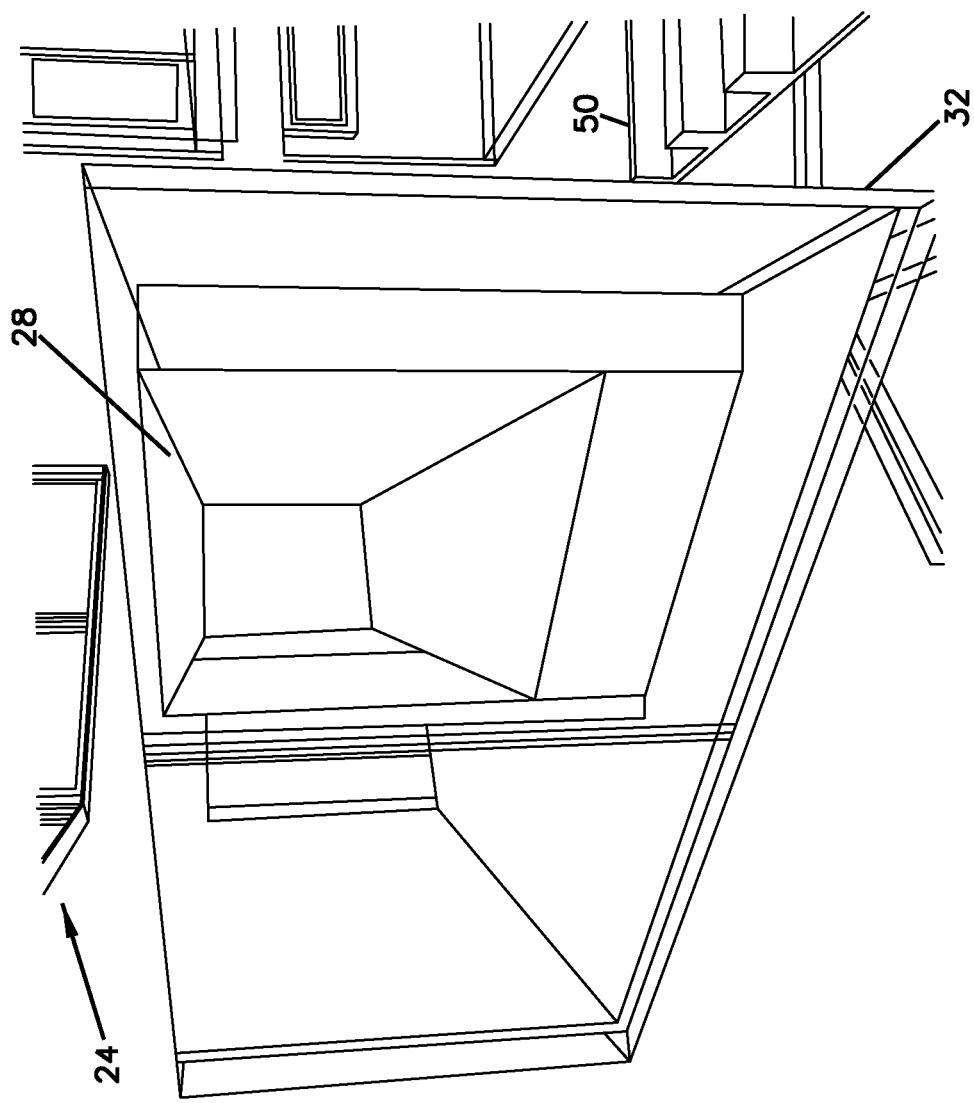
FIG. 9 is a perspective view of a portion of a building in accordance with the present invention.

FIG. 9 is a cross section of the pool 28 and apron 30. As radiant energy is pulled into the pool, heat goes to cold. Part of the convection cycle occurs in the pool 28. The pool cover (if used), exchange wall 32, and chimney 36 (not shown in FIG. 9) receive direct sunlight. The exchange wall 32 and chimney connect directly to the mass in the first floor, and therefore help to maintain a constant temperature. In colder northern climates, the pool 28 may be isolated from the ground. This may help prevent overcooling or freezing. As cold penetrates the solarium windows 26 above the cold air vents 68, it falls through the vents 68 into storage underneath.

FIGS. 10, 10a, 11, 11a and 11b illustrate an embodiment of an air flow cycle for maintaining constant temperature according to the method of the present invention. Starting at the base 34 of the building 20, air rising from the exchange wall 32, pool 28, and chimney mass cycles inside the building 20 to distribute heat or cold throughout the building 20. For example, heat rises from the mass adjacent to the first floor, and is guided into the second floor by a third floor extension 70 over the solarium as shown. The remainder of the air continues to rise to the third floor 72. As the warm air rises, it is distributed throughout the home cyclically. As it cools, it may be guided down the return air shaft 60. The return air shaft 60 may run from the third floor all the way down to the base 34 of the building 20 to facilitate an efficient air cycle. The location of the return air shaft in the pointed structure of the building 20 helps minimize temperature "dead spots" within the building 20, where temperatures are not regulated due to lack of air flow. The air flow may then encounter the raised basement floor 74 and be guided across the horizontal fins 50. As the air hits the exchange wall 32, the heat within the mass may be carried with the air, which may then be pushed out the exchange wall vents 68, and up into the solarium 24 to continue the cycle.

Figure 11:
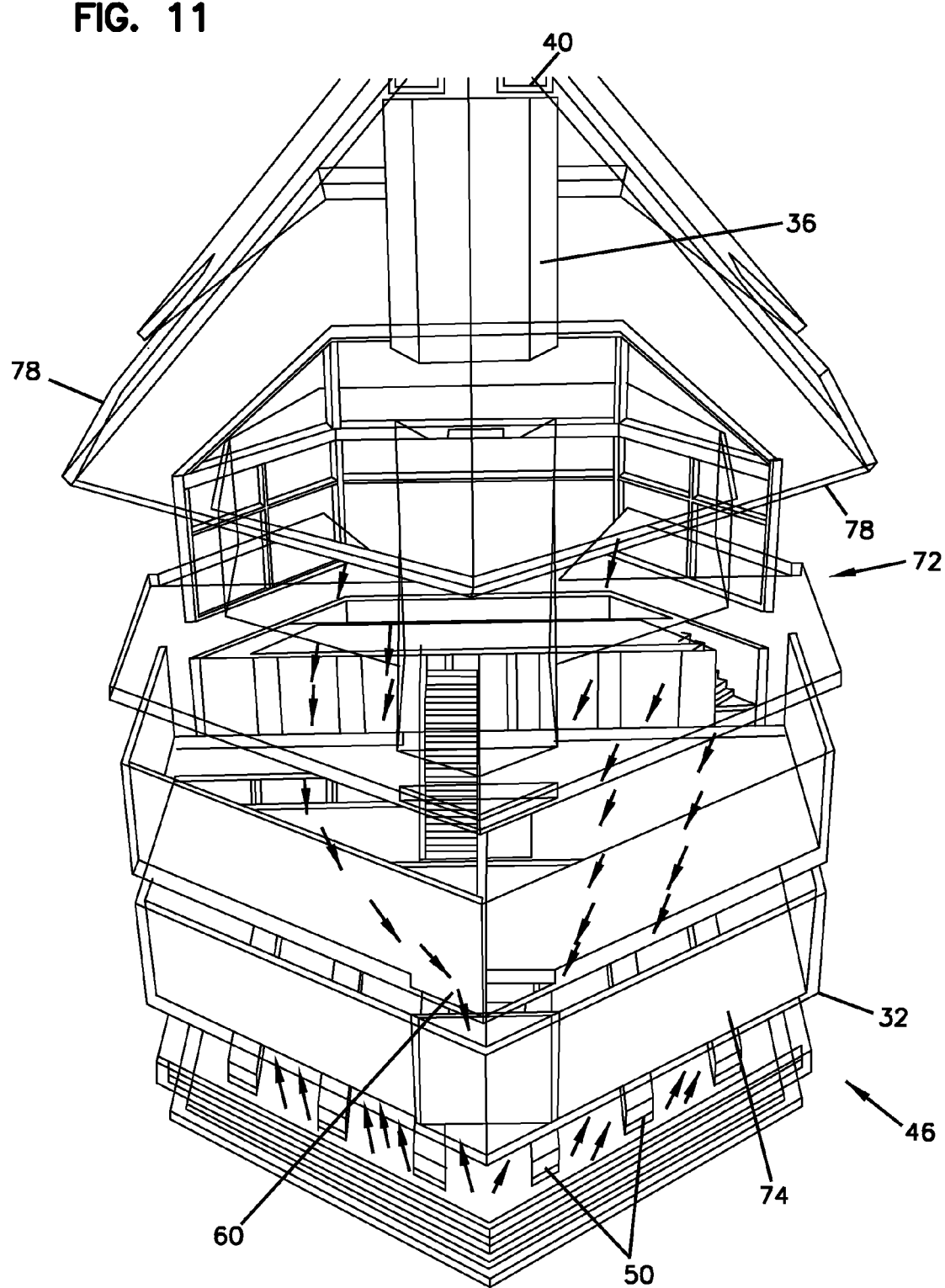
FIG. 11 is an exploded view, partially in cross-section, depicting an airflow through an embodiment of a building in accordance with the present invention.

FIGS. 11 and 11a provide another view depicting the air flow cycle. Air runs underneath the raised basement floor until it encounters the vents 68 at the base of the exchange wall 32. The air is then drawn up through the vents 68 against the mass, and the cycle repeats. The heated air then rises up the solarium 24 and into the upper second and third floors 72 to be drawn across the building 20. As shown, the third floor 72 may be located underneath eaves 78 to provide additional protection from the weather.

FIGS. 12 and 13 depict the varying angles of sunlight that may impact the solarium 24 during different months in different locations. For example, in June at noon, the sun angle may be 73.5 degrees, while in winter, a much more gentle 27 degree. A roof overhang 80, above and/or part of the solarium 24, may be selected and/or adjusted for more or less shade coverage to maximize sunlight in colder climates during the winter months, while not permitting overheating during the summer. FIG. 13 is a cross section of the building 20 schematically depicting how the angle of the sun affects heat gain throughout the building 20.

Figure 14:
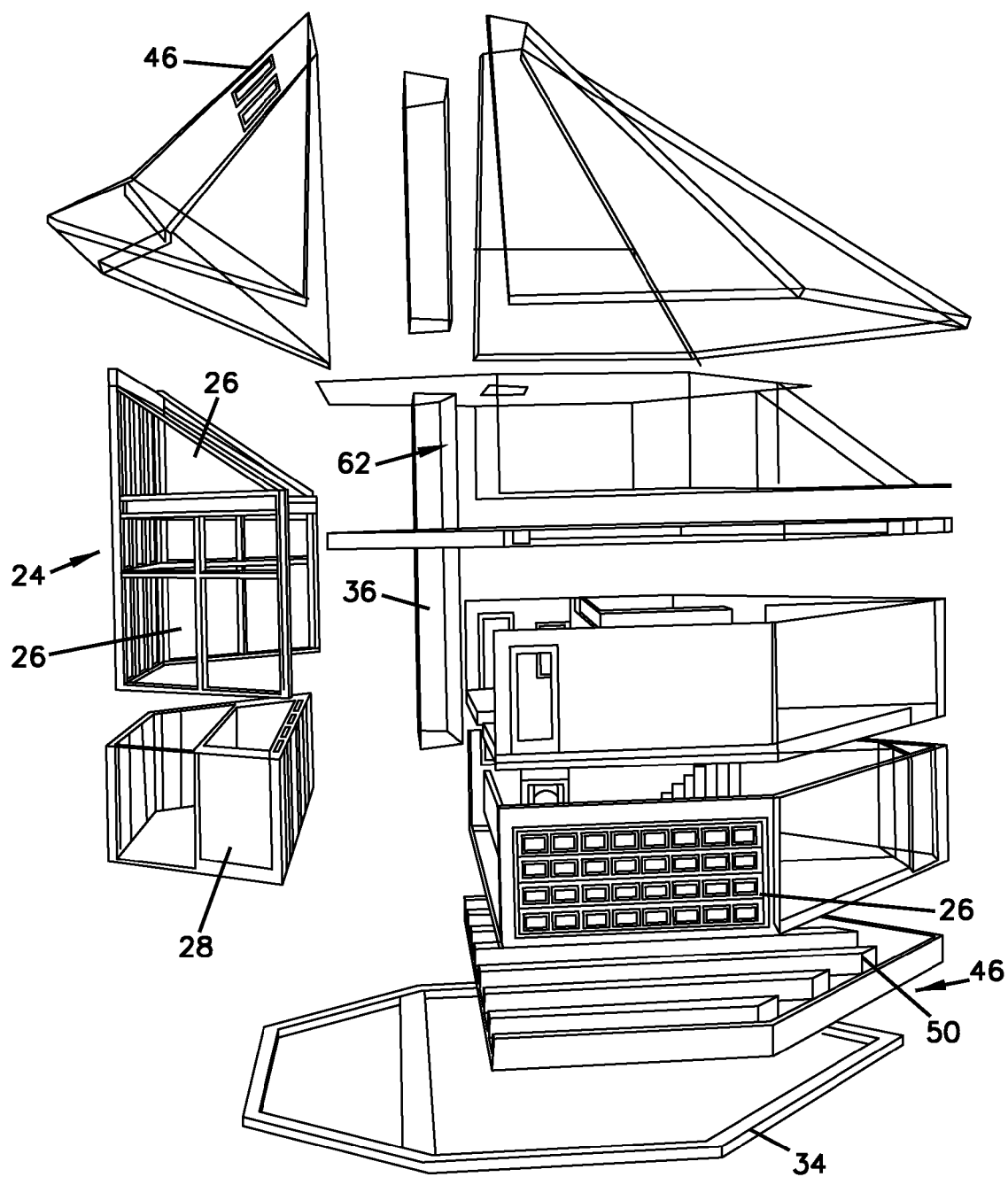
FIG. 14 is an exploded view of an embodiment of a building in accordance with the present invention.
Figure 15:
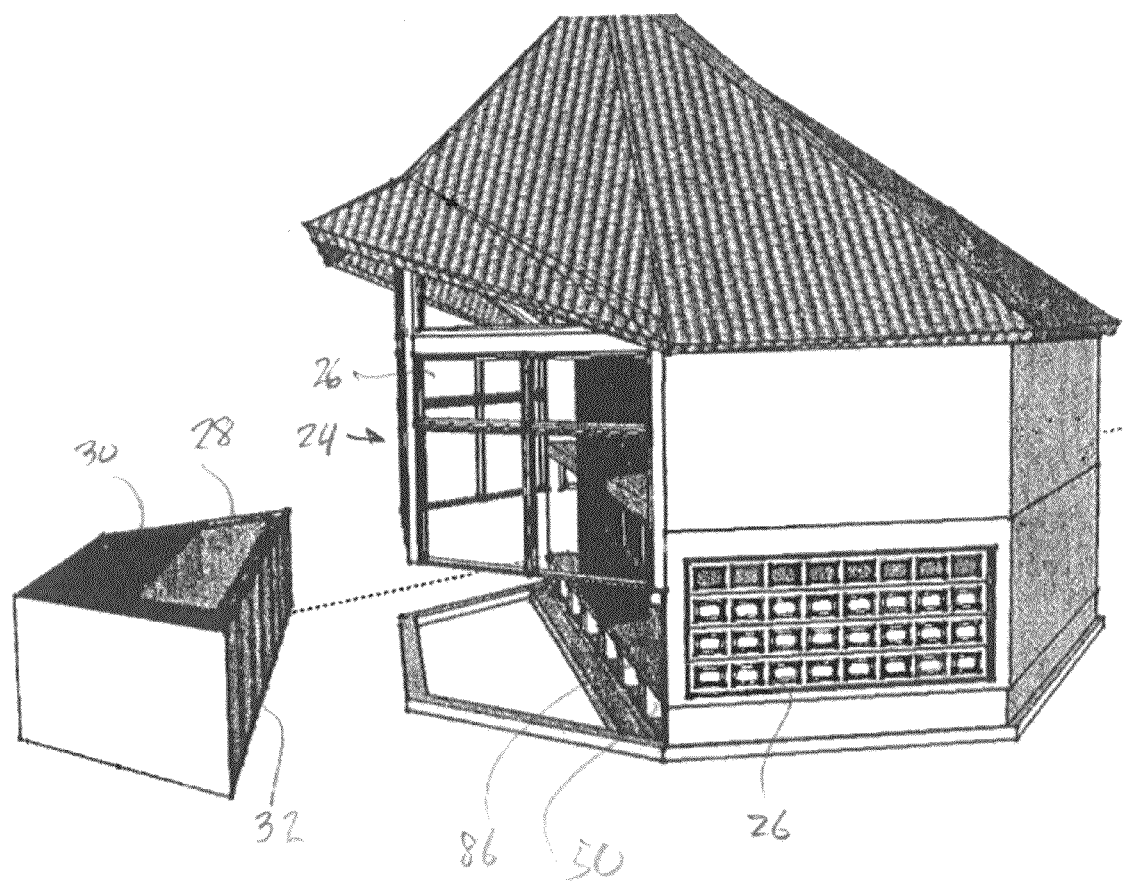
FIG. 15 is a perspective view of a portion of a building in accordance with the present invention, partially exploded.

FIGS. 14 and 15 are exploded views of an embodiment of a building and temperature regulation system, and components of the building 20, according to an embodiment of the present invention. The building components are commonly numbered in accordance with the preceding Figs. FIG. 15 shows the pool 28, apron 30 and exchange wall 32 separated from the building 20 to show how the air flow cycle extends under the basement floor 86 above the fins 50.

Figure 16:
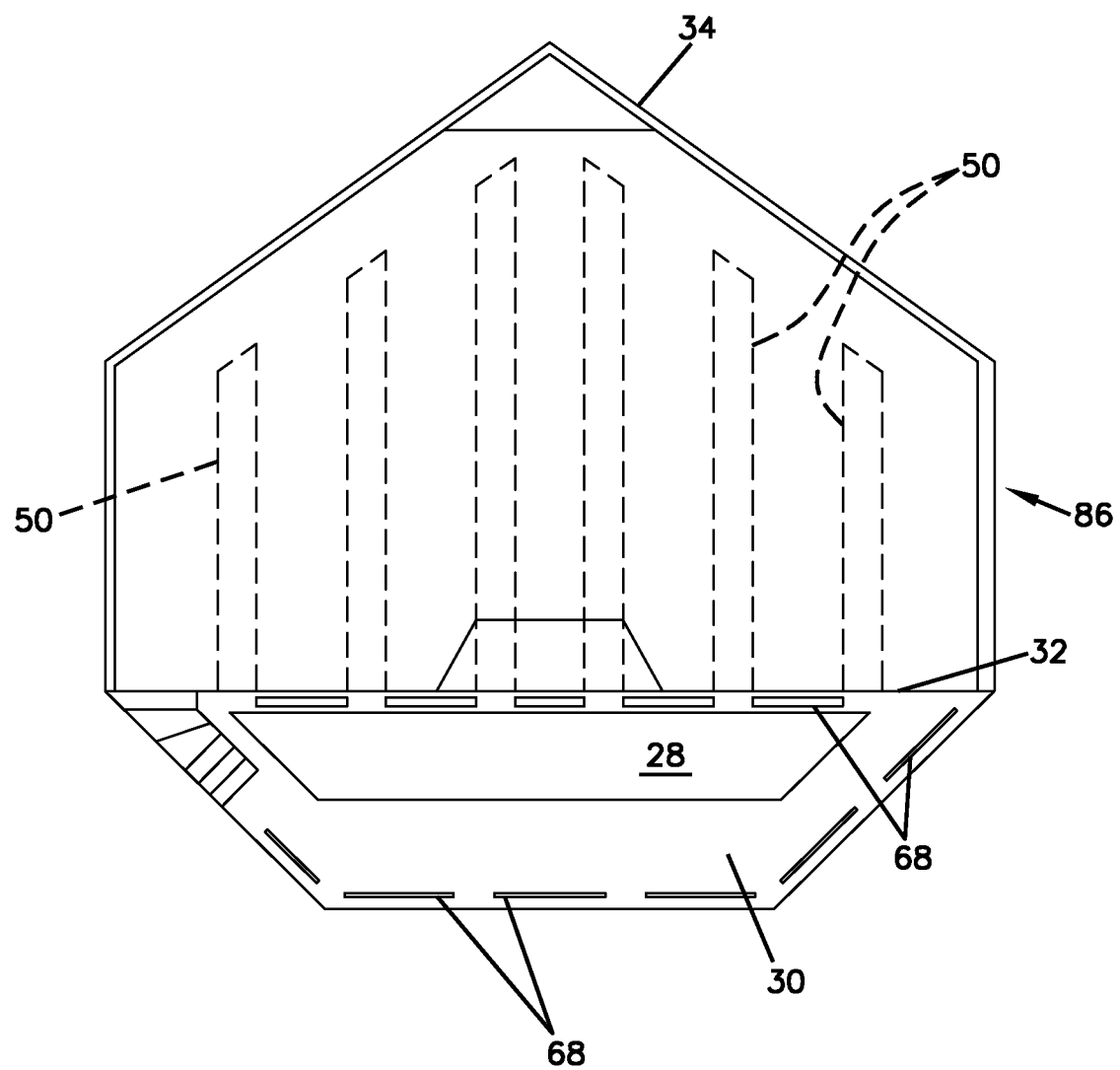
FIG. 16 depicts an embodiment of a portion of a building in accordance with the present invention.
Figure 17:
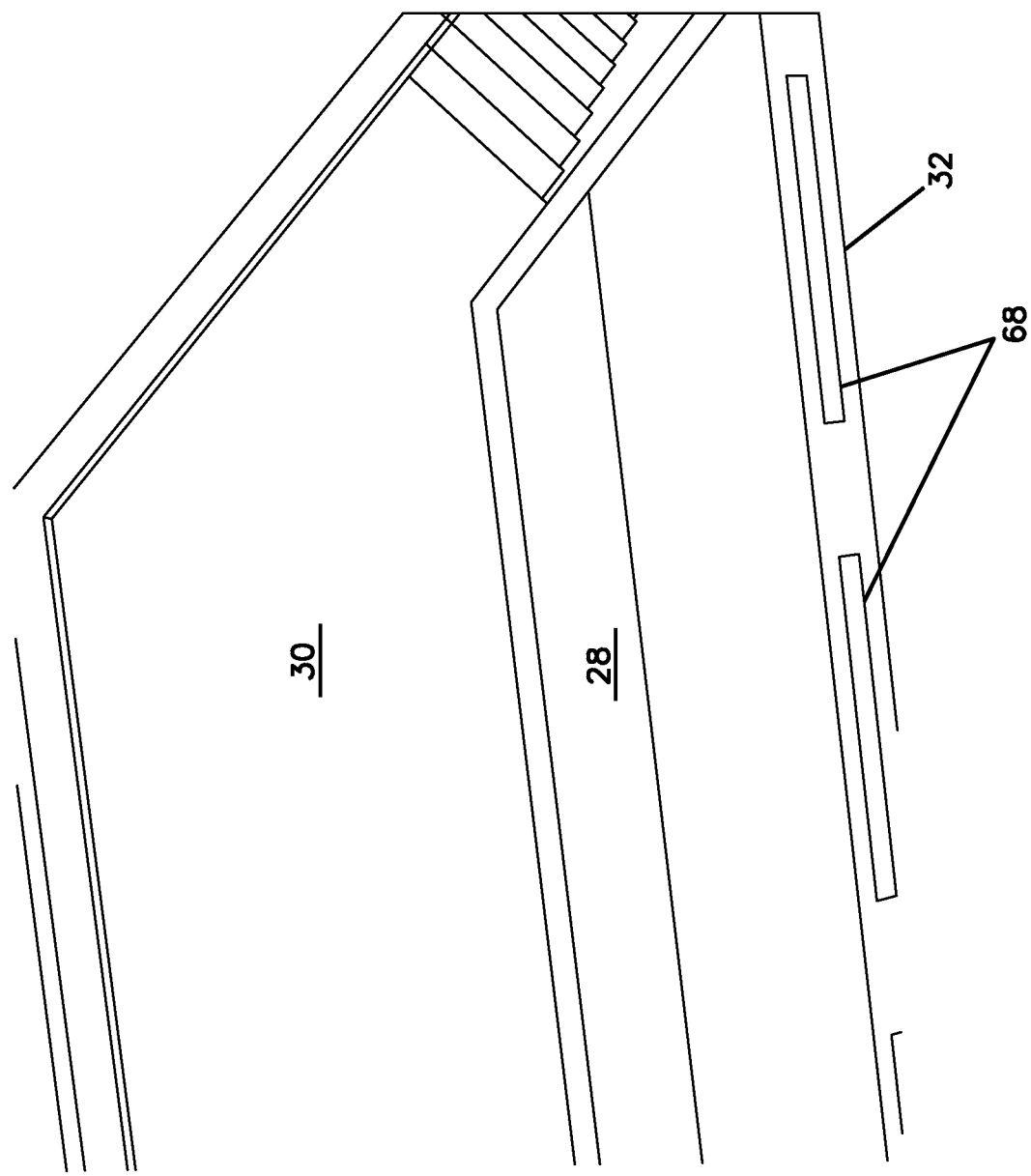
FIG. 17 depicts an embodiment of a portion of a building in accordance with the present invention.
Figure 18:
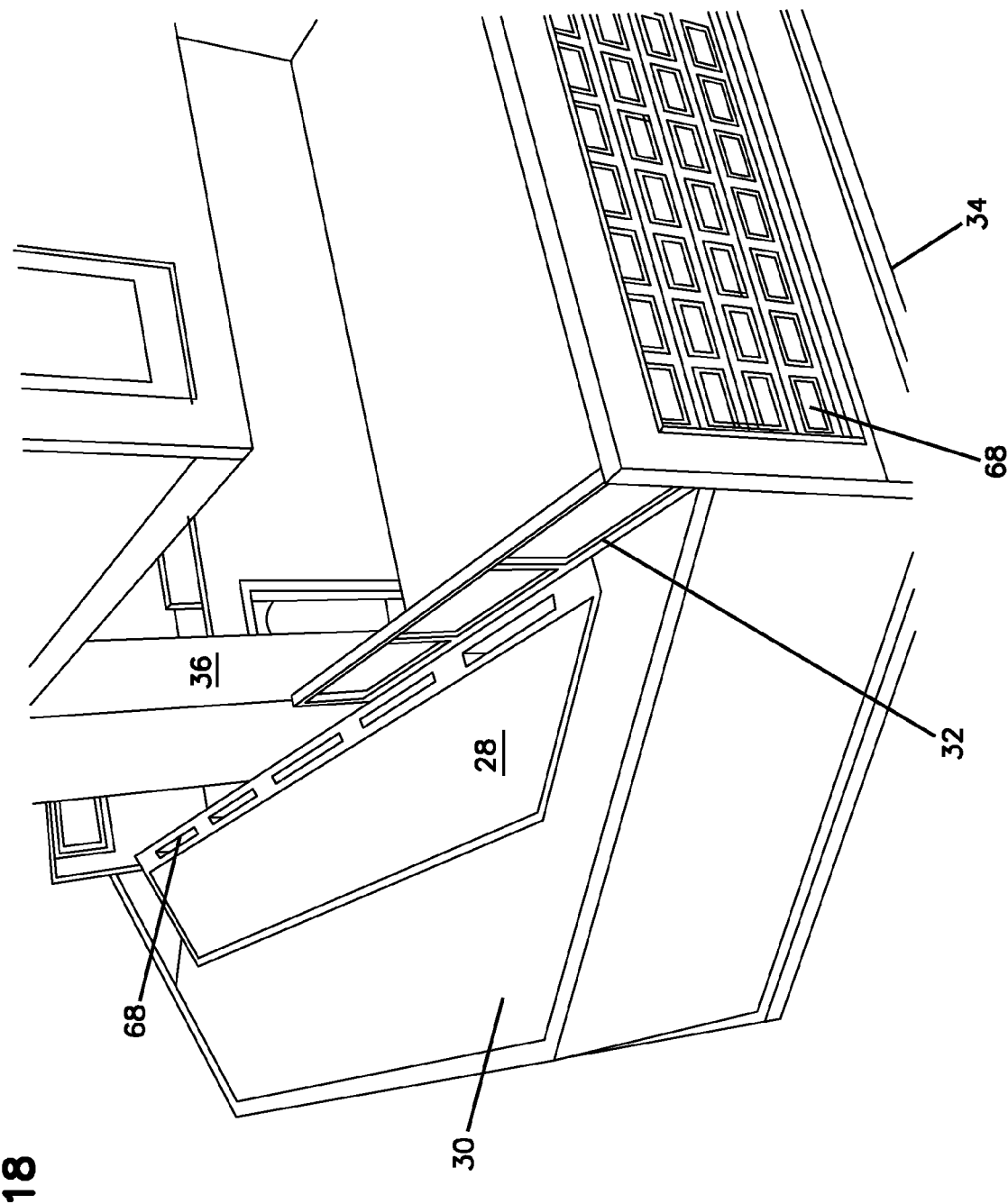
FIG. 18 depicts an embodiment of a portion of a building in accordance with the present invention.

FIGS. 16-18 further depict the relationship among building components, including the pool 28, exchange wall 32, vents 68 and fins 50, and how they and their location and structural relationship contribute to the conductive and/or convective flows provided and/or enabled by embodiments of the present invention.

A building and system in accordance with the present invention may be constructed and/or composed of suitable sustainable and/or renewable materials and resources, e.g. wood, stone, recycled material, etc. This can have the added benefit of safer construction and manufacturing processes, while maintaining long lasting structures. While the embodiments illustrated in the Figs. generally reflect a building model with dimensions of 48 feet north to south and a solarium with a depth of 12 feet, the building may be scaled up or down to facilitate larger or smaller needs. Further, the building may be more or less insulated from the ground depending on the climate, and may have suitable insulation between the first floor walls and the ground to prevent heat exchange. In some embodiments, additional vents between interior areas and/or between interior and exterior may be used, and vents may be shifted in location according to circulation needs and/or building location. Within the United States, northern buildings are generally in colder climates and therefore should be capable of storing heat longer, while southern buildings require less heat storage, and therefore less insulation from the ground. Some embodiments according to the present invention may use approximately 25% of the building surface area for windows, and 25% of the building area for heat storage. However, other ratios are also possible while maintaining a substantially constantly regulated building temperature.

An appendix is attached, and shows exemplary specifications, operational and performance factors and calculations for exemplary embodiments of a building and system in accordance with the present invention.

Embodiments of the present invention, including preferred embodiments, have been presented for the purpose of illustration and description. They are not intended to be exhaustive or to limit the invention to the precise forms and steps disclosed. The embodiments were chosen and described to illustrate the principles of the invention and the practical application thereof, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

I claim:

1. A method for regulating the interior temperature of a building, the building having an interior building space including at least one thermal mass for receiving and holding energy, distribution vents, an air return, and a solarium comprising glass windows exposed to solar energy, the method comprising:
    collecting solar energy transmitted through the solarium windows at an apron thermally coupled to the at least one thermal mass, at least a portion of the apron arranged at an area between an exterior of the building and the at least one thermal mass;
    holding the solar energy in the at least one thermal mass;
    enabling an air flow from the at least one thermal mass using the distribution vents; and
    returning the air flow to an exchange wall of the at least one thermal mass via a plurality of horizontal fins, wherein heat derived from the solar energy is distributed through the building by the air flow.

2. The method according to claim 1, wherein the air flow is convective.

3. The method according to claim 2, wherein the thermal mass is for receiving and holding heat and for remaining unheated when not receiving heat.

4. The method according to claim 3, wherein the airflow is enabled by conduction and convection.

5. The method according to claim 4, wherein the airflow is enabled only by conduction and convection.

6. The method according to claim 1, wherein at least a portion of the apron is arranged at an area adjacent the windows.

7. The method according to claim 1, wherein a first floor of the building is supported by the plurality of horizontal fins.

8. The method according to claim 1, wherein the thermal mass is at least partially in a first floor of the building.

9. The method according to claim 1, wherein the air flow is activated by collecting the solar energy transmitted through the solarium windows.

10. The method according to claim 1, further comprising pulling cool temperature from one or more of concrete in a base of the building, concrete below the base of the building, a ground below the base of the building, or footings of the building.

11. The method according to claim 10, further comprising transferring the pulled cool temperature to the thermal mass by promoting air flow through a cold air vent to the thermal mass, the cold air vent located within the interior building space.

12. The method according to claim 1, wherein the building further comprises a computer and sensor system configured to maintain a substantially constant and stable temperature within the interior building space, the sensor configured to detect a sensed temperature.

13. The method according to claim 12, wherein the computer and sensor system maintains the substantially constant and stable temperature within the interior building space by controlling a window covering of the solarium windows to vary the windows' transparency to sunlight in response to the sensed temperature.

14. The method according to claim 12, wherein the computer and sensor system maintains the substantially constant and stable temperature within the interior building space by one or more of: opening and/or closing one or more of the windows in response to the sensed temperature, opening and/or closing a skylight of the building in response to the sensed temperature, opening and/or closing the distribution vents in response to the sensed temperature, and/or isolating the solarium from a main living space of the building.

15. The method according to claim 1, wherein the thermal mass comprises a pool of potable water.

16. The method according to claim 14, wherein a portion of a convection cycle occurs within the pool.

* * * * *